CARL L. PARKER
INVENTOR.

BY *Herbert J. Brown*
ATTORNEY

United States Patent Office 3,289,465
Patented Dec. 6, 1966

3,289,465
ULTRASONIC LEAK LOCATOR
Carl L. Parker, Fort Worth, Tex., assignor to Malor Manufacturing, Inc., Fort Worth, Tex., a corporation of Texas
Filed June 12, 1964, Ser. No. 374,627
1 Claim. (Cl. 73—40.5)

This invention relates to ultrasonic leak detectors for locating leaks in pressurized telephone cables and other pressurized systems and containers. Particularly, the invention is directed to improvements in apparatus for locating the source of ultrasonic vibrations generated by escaping air or gas through small openings, and wherein the apparatus is primarily comprised of a transducer, means translating ultrasonic frequencies to audible frequencies, and earphones.

Telephone cables containing multiple wire conductors, each being only thinly insulated, are commonly pressurized with dry air or other gas to prevent entry of moisture through small openings which occur from time to time in the cable sheath. Locating devices on poles having two wheel carriages, a reflector and the translating apparatus referred to, have been used for scanning overhead cables.

An object of the invention is to eliminate at least one of the two wheels and the reflector and thereby effect an economy of construction.

Another object of the invention is to provide an ultrasonic leak locator capable of use as a hand probe in addition to scanning aerial cables.

A further object of the invention is to provide an ultrasonic leak detector particularly adaptable for use in scanning aerial telephone cables having plastic sheaths.

These and other objects of the invention will become apparent from the following description and the accompanying drawing, wherein.

Figures 1, 2, 3, 4, 5, 6:
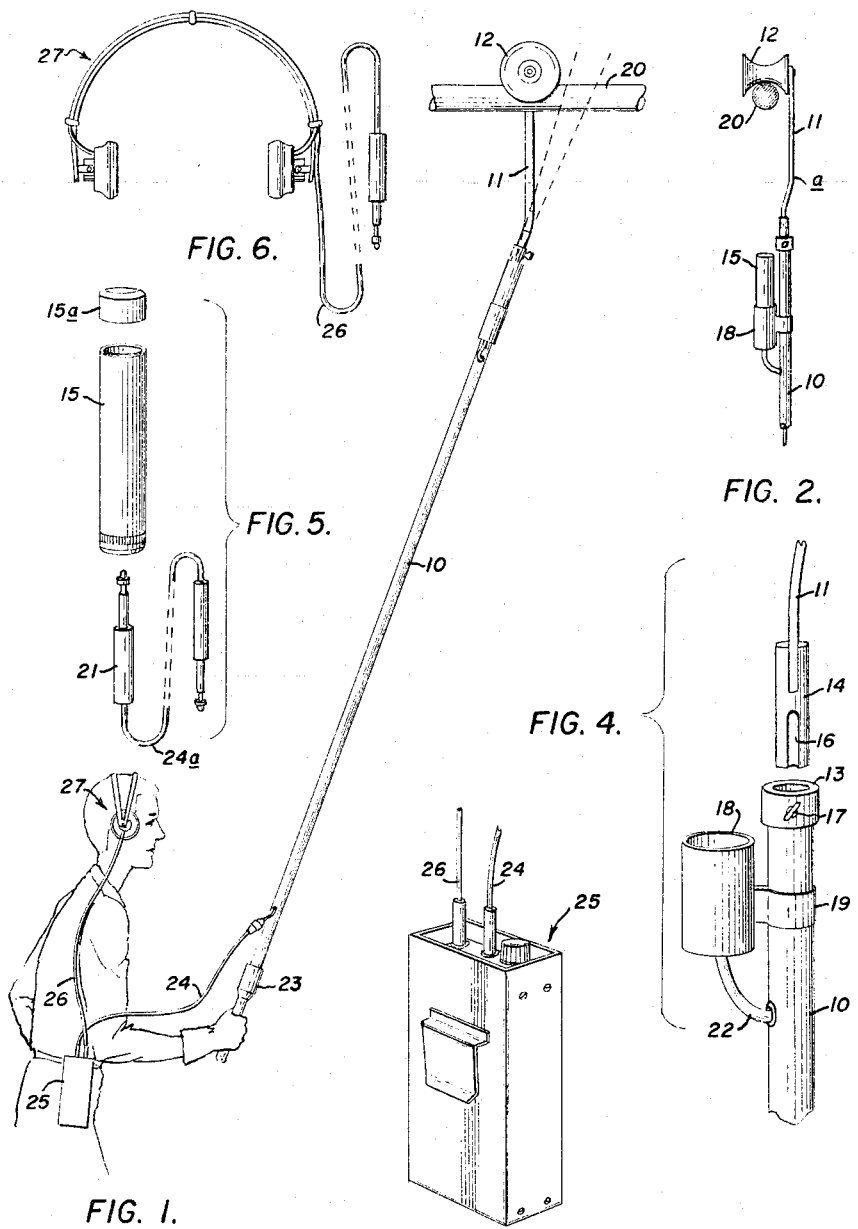
FIGURE 1 is a side elevational view showing a preferred embodiment of the invention in operation on an aerial cable.
FIGURE 2 is a fragmentary elevational view taken at a right angle with reference to FIGURE 1.
FIGURE 3 is an enlarged perspective view of a control box including means translating ultrasonic frequencies to audio frequencies and amplifying the latter.
FIGURE 4 is an exploded enlarged fragmentary elevational view of the upper end of the probe pole and the lower end of the wheel arm.
FIGURE 5 is an exploded perspective view of the transducer, cap therefor and extension cord which is employed when the transducer is used as a hand probe.
FIGURE 6 is an elevational view of a head set including conventional earphones, together with a cord, shown partly by dotted lines, for connection with the control box.

The form of the invention shown includes a pole 10 having an angularly disposed arm 11 on one end and a circumferentially grooved wheel 12 on the extending end and a side of the arm. The arm 11 is demountably received in a socket 13 on the end of the pole 10. Since the arm 11 shown is flat, there is a cylindrical post 14 secured to its end opposite the wheel 12 and which post is a sliding fit in the socket 13. To assure proper position of the wheel 12 relative to a transducer 15 mounted on the pole 10, there is a longitudinal groove 16 in the cylindrical surface of the post and which groove is engaged by a thumb screw in the socket 13. The wheel 12 is preferably of a relatively soft or resilient material such as some suitable synthetic resin. Such material not only reduces noise when contacting the cable 16, but is less likely to mar or cut plastic sheaths now in use.

The transducer 15 is slidably received in a cup holder 18 mounted on a side of the pole 10 by means of a clamp 19. The axis of the transducer is directed to the center of an overhead cable 20 when the wheel 12 is mounted thereon. Not shown, there is a plug connector in the bottom center of the holder 18 like the plug connector 21 shown in FIGURE 5. The plug connector in the holder 18 has a cord 22 extending through the pole 10 to near the handle end 23 thereof where the cord has a conection 24 extending to a control box 25. An additional connection 26 extends to a head set 27. The control box 25 is conventional and translates ultrasonic frequencies to audio frequencies and amplifies the latter. The tranducer 15 may be removed from the holder 18 and by using a relatively short connector 24a, the transducer may be used as a hand probe. The cap 15a may be provided for the transducer 15 to protect the same when not in use.

In operation, and as shown in FIGURE 1, the wheel 12 is placed on the cable 20 by means of the pole 10 and guided along the cable by the handle end 23. The transducer 15 is directed, as shown by dotted lines, to a length of cable 20 forwardly of the wheel 12, and thus wheel noise is minimized. Even minute vibrations emitting from the side of the cable opposite the transducer 15 are picked up, translated and amplified.

The invention is not limited to the exemplarly construction herein shown and described, but may be made in various ways within the scope of the appended claim.

What is claimed is:

Apparatus for locating leaks in pressurized aerial cables, said apparatus comprising a pole, a single circumferentially grooved wheel on an end of said pole and having its axis transverse to the pole's length, an ultrasonic detector directed along said pole toward said cable when said wheel is mounted thereon, a control box connected with said ultrasonic detector, and a head set connected with said control box, an arm angularly supporting said wheel with reference to the length of said pole and directing said ultrasonic detector forwardly of said wheel.

References Cited by the Examiner
UNITED STATES PATENTS

| 440,665 | 11/1890 | Thomson | 191—65 X |
| 616,983 | 1/1899 | Speiden | 179—175 |
| 2,291,533 | 7/1942 | Cummings | 324—52 X |
| 2,518,327 | 8/1950 | Jahn | 73—40.7 X |
| 3,036,457 | 7/1962 | Wood | 73—40.5 |

LOUIS R. PRINCE, *Primary Examiner.*
JAMES RENJILIAN, WILLIAM A. HENRY,
*Assistant Examiners.*